United States Patent [19]

Bittermann et al.

[11] 4,038,133
[45] July 26, 1977

[54] NUCLEAR REACTOR WITH SUSPENDED FUEL ASSEMBLIES HAVING SECONDARY EMERGENCY SUSPENSIONS

[75] Inventors: Dietmar Bittermann, Erlangen, Germany; Kevin Hunt, Macclesfield, England; Klaus Klein, Erlangen; Peter Rau, Mittelehrenbach, both of Germany

[73] Assignee: Siemens Aktiengesellschaft, Munich, Germany

[21] Appl. No.: 681,112

[22] Filed: Apr. 28, 1976

Related U.S. Application Data

[63] Continuation-in-part of Ser. No. 462,434, April 19, 1974, abandoned.

[30] Foreign Application Priority Data

Apr. 19, 1973 Germany .................. 2320146

[51] Int. Cl.² .................. G21C 9/00
[52] U.S. Cl. .................. 176/38; 176/30; 176/77; 176/78; 176/87
[58] Field of Search .................. 176/30, 36, 37, 38, 176/43, 50, 77, 78, 87

[56] References Cited

U.S. PATENT DOCUMENTS

| 2,877,170 | 3/1959 | Greenhalgh et al. | 176/77 |
| 3,163,585 | 12/1964 | Metcalfe et al. | 176/78 |
| 3,164,530 | 1/1965 | Banks | 176/78 |
| 3,287,230 | 11/1966 | Jerkens et al. | 176/77 |
| 3,340,154 | 9/1967 | Sinclair et al. | 176/77 |

Primary Examiner—Samuel W. Engle
Assistant Examiner—S. A. Cangialosi
Attorney, Agent, or Firm—Kenyon & Kenyon, Reilly, Carr & Chapin

[57] ABSTRACT

A reactor has a core formed by a plurality of laterally adjacent fuel assemblies, each assembly comprising a vertically elongated casing containing a bundle of fuel rods and having an upper end connected to a tubular suspension rod forming the primary suspension means for the casing, failure of this means permitting the fuel assembly to drop from the core. In each instance, an instrumentation tube having an upper end supported independently of the primary suspension rod, extends downwardly through the latter, and centrally through the casing to the lower end of the latter. This instrumentation tube and the fuel assemblies adjacent to each other remain suspended so as to form vertically fixed parts relative to any one assembly that might drop accidentally. Each of the casings have latch means for normally latching the casing to one of these fixed parts so as to each casing it cannot fall substantially relative to that one of the parts in the event of a failure of its tubular suspension rod normally forming its primary suspension.

7 Claims, 9 Drawing Figures

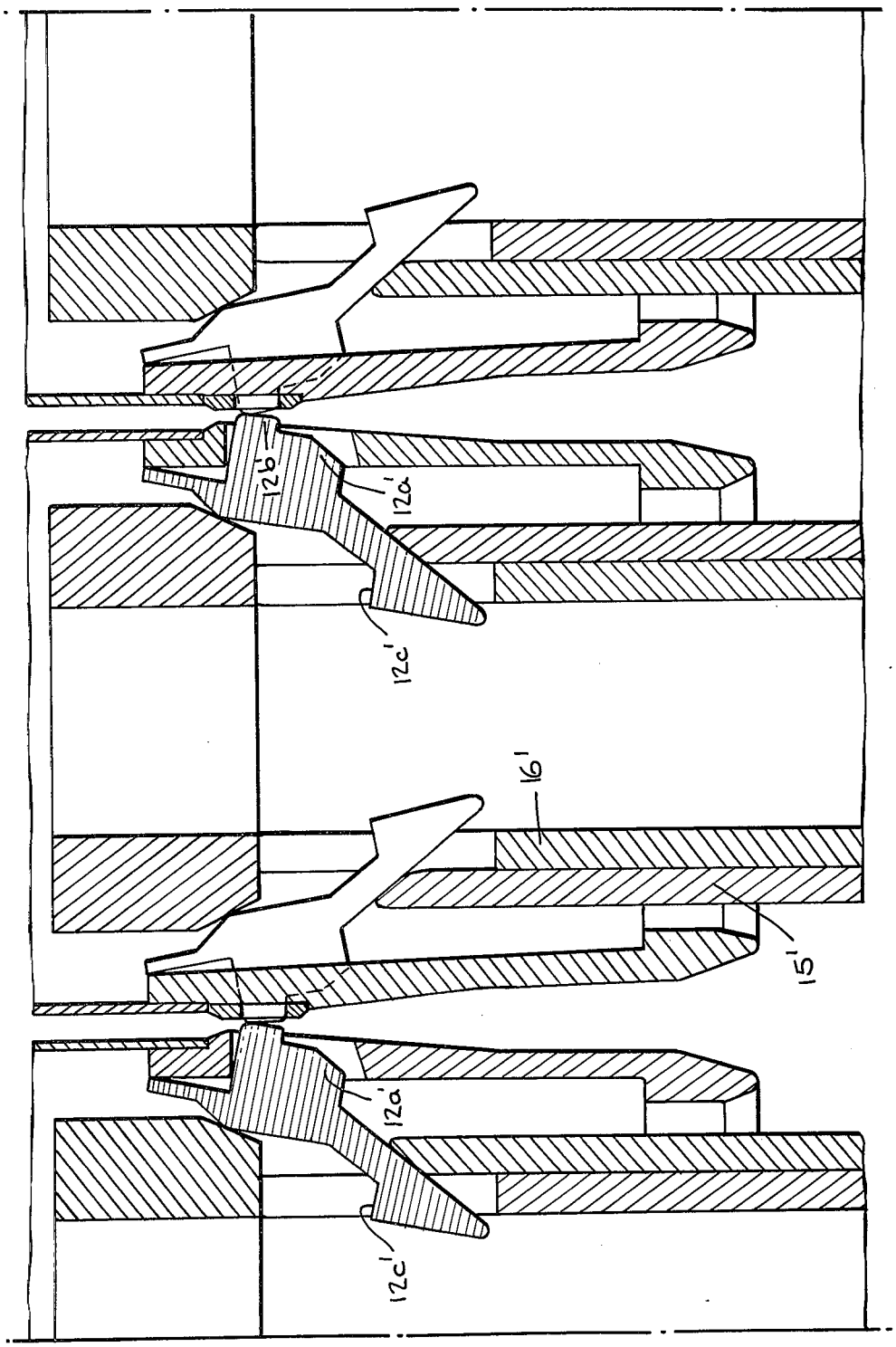

NUCLEAR REACTOR WITH SUSPENDED FUEL ASSEMBLIES HAVING SECONDARY EMERGENCY SUSPENSIONS

BACKGROUND OF THE INVENTION

This is a continuation-in-part application of applicants' co-pending original application S.N. 462,434, filed Apr. 19, 1974 now abandoned. In the original application, a certified copy of applicants' German application No. P, 23, 20, 146.9, filed Apr. 19, 1973, was filed and a claim for priority under 35 U.S.C. 119 was made, and a corresponding claim for priority is made as to the present continution-in-part application.

Prior art, gas-cooled fast breeder reactors commonly include a concrete pressure vessel containing a reactor core formed by a plurality of laterally adjacent fuel assemblies, each assembly comprising a vertically elongated casing containing a bundle of fuel rods, the casing having an upper end and extending downwardly therefrom and having an open lower end extending below the fuel rods. Each casing has a vertical tubular suspension rod having an upper end with a supported connection with the concrete pressure vessel top and a lower end with a connection to the casing's upper end so that the casing is suspended thereby. At least one of the connections of the tubular suspension rod is made releasable so that any one of the fuel assemblies can be lowered from the core for servicing of the core.

These vertical tubular suspension rods form the primary suspensions for the fuel assemblies. If any one of these suspensions fail so as to accidentally release an assembly during operation of the reactor, the assembly can drop from the core. These primary suspensions are designed to provide a redundancy of safety, but a failure by one or more of the suspensions is at least hypothetically possible.

During operation of the reactor the flow of gas coolant is downwardly through the fuel element casings and it is desirable to determine the operating temperatures of each of the fuel assemblies individually.

Therefore, each fuel element has an instrumentation tube having an upper end releasably fixed above the casing, this upper end normally projecting upwardly through the top of the concrete pressure vessel within an external pressure tube providing for the passage of electrical lines in a pressure-tight manner to instrumentation external of the reactor pressure vessel. In each instance, this tube suspends from its upper end downwardly and slidingly through the suspension rod and casing to terminate with a lower end below the fuel rods and in the casing's lower end where, for example, the tube contains a thermocouple from which electrical lines extend upwardly through the instrumentation tube to the outside of the pressure vessel.

The instrumentation tube is, in each instance, made so it can be removed upwardly by sliding upwardly through the fuel assembly casing and the tubular suspension rod suspension by which fuel assembly is suspended. The upper ends of the instrumentation tubes are fixedly supported by connections entirely separate from the connections by which the upper ends of the tubular suspension rods are fixed, although the upper ends of the instrumentation tubes must be releasable so that the tubes can be drawn upwardly, to assure against the hypothetical possibility that one or more of the instrumentation tubes might be inadvertently released for falling during operation of the reactor. The connections supporting the top ends of the instrumentation tubes are made with a redundancy of security or resistance to inadvertent release, and the instrumentation tubes are themselves made of metal and with dimensions providing a redundancy of tensile strength.

SUMMARY OF THE INVENTION

The present invention provides a secondary emergency suspension for each of the fuel elements without substantially altering the above described prior art construction, thereby eliminating any need for redesigning or reengineering that time-proven construction. In addition, this secondary or emergency suspension is provided by simple parts which are very inexpensive relative to other possible expedients.

Keeping in mind that in the case of an accidentally released fuel assembly, both its instrumentation tube and all or at least most of the adjacent fuel assemblies can reasonably be expected to remain securely suspended and form fixed parts relative to the released assembly, this invention provides a simple latch means for normally latching each casing of each of the assemblies, to one of such parts that can be expected to remain securely suspended, thus providing for each of the fuel elements, a secondary or emergency suspension without the use of any extra parts other than those required for the latch means.

With each assembly casing latched or locked to either its instrumentation tube or one or all of the casings of the assemblies adjacent to that assembly, the problem is presented of unlatching the latch means when it is desired to intentionally release the assembly for downward movement during core sevicing. At that time, the concrete pressure vessel in which the core is positioned, is designed to permit access upwardly to the bottoms of the fuel elements. With this in mind, the present invention provides each of the latch means with a latch release means on the inside of the casing, together with a tool that is insertable upwardly via the casing's open lower end, in each instance, for actuating the latch release means to release the latch means. The same tool can be used for one assembly after another or several of the tool means could be used simultaneously to release the latch means as to a group of the fuel assemblies. The tool means is, of course, used when the reactor is shut down and it is necessary to lower one or more of the fuel assemblies downwardly for core servicing operations.

Even though the latch means is in simple form and does not apply vertically directed force to any of the parts, in the manner of a clamp means, and even though the latch means involves some looseness with respect to the interlatched parts, any looseness involved can be made so minor in the vertical direction as to catch an accidentally released fuel assembly almost immediately and before it has achieved any downward velocity sufficient to acquire destructive momentum with respect to the fixed parts to which it is latched.

The above factors mean that if each assembly is latched to its instrumentation tube, the latter is able to reliably prevent the assembly from falling, or if it is latched to the casings of adjacent assemblies, their normal primary suspension means are well able to carry the weight of the released assembly. Correspondingly, the latch means may be made in the form of relatively small latches which do not interfere with the downward coolant gas flow through the core to an appreciable degree, while permitting the latch means to be provided by latches of simple design and which, therefore, do not add greatly to the overall cost of the core construction. The necessary tool means for releasing the latches is of simple construction and is, of course, capable of being used repeatedly.

BRIEF DESCRIPTION OF THE DRAWINGS

Specific examples of the present invention are illustrated by the accompanying drawings, in which:

FIG. 1 is a side elevation, partially sectioned, showing a part of the concrete pressure vessel, the usual suspension means, and one of the fuel assemblies, substantially as previously referred to;

FIG. 6 is a perspective view of the top end of the tool means;

FIG. 7 schematically shows a plurality of the fuel assemblies adjacent to each other, looking upwardly;

FIG. 9 is the same as FIG. 8 but showing the unlatching action using a plurality of tools so that the group of assemblies shown by FIG. 7 can be simultaneously unlocked relative to each other, by simultaneous unlatching of their respective latching means.

DETAILED DESCRIPTION OF THE INVENTION

Figure 1:
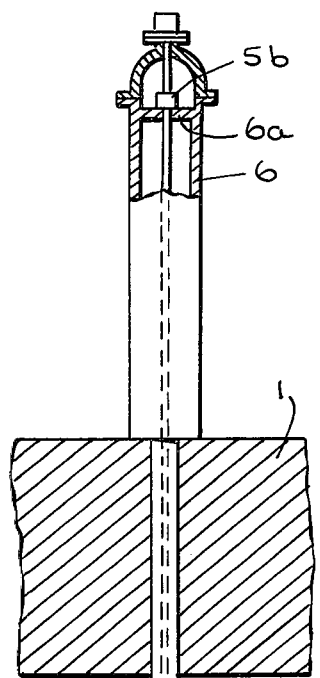

In the first example of the invention shown by FIGS. 1 through 6, a small section of the concrete pressure vessel 1 of a gas-cooled fast breeder reactor is shown, this supporting the upper end of one of the fuel assemblies vertically elongated casings or cans 2 containing a bundle of fuel rods 3 positioned in the usual manner, and having an upper end 2a and extending downwardly therefrom and having an open lower end 2b extending below the bottom ends of the fuel rods 3. This lower end of the casing is normally termed the nozzle, because the gas coolant flows downwardly therethrough at relatively high velocity. Although not shown in the case of this first example, a plurality of the fuel assemblies are grouped together adjacent to each other, the casings being of hexagonal shape so that they can nest close together in groups, as indicated by FIG. 7 showing a second example of the invention.

The casing 2 has a vertical tubular suspension rod 3 with a supported connection above the casing via the pressure vessel top 1 and a lower end with a releasable screw-threaded connected 3a to the casing's upper end 2a, so that the casing is suspended thereby. The suspension rod customarily is tensioned not only by the weight of the fuel assembly, but also because it is required to hold the assembly with its upper end 2a tightly within one of the openings in the usual grid plate 4 and down through which the gas coolant flows into the upper end of the assembly's casing, the details of the construction involved not being shown because it can be conventional. The casing 2 can, of course, be lowered from the grid plate opening upon release of the upward force applied through the suspension tube 3.

The instrumentation tube 5 is shown with its lower end 5a terminating within the bottom end or nozzle 2b of the casing, this instrumentation tube 5 having an upper end 5b which independently of the connection of the suspension tube 3 with the pressure vessel, is fixed above the casing 2 by projecting upwardly through the pressure vessel top into the tubular pressure containment 6 where the instrumentation tube's top end has an enlargement or collar supporting that upper end by resting on the top wall 6a of the pressure containment tube 6.

Although not shown, normally a thermocouple would be inthe bottom end 5a of the instrumentation tube with its necessary electrical lines extending upwardly to the top end of the instrumentation tube above the wall 6a, from which the lines would extend to external instrumentation. When servicing is required, the instrumentation tube 5, being slidable throughout its length relative to the other parts, can be slid upwardly and removed from the pressure vessel 1, without disturbing the fuel assembly or its casing's suspension rod 3. On the other hand, during core servicing, by release of the casing's upper end from the suspension rod, the fuel element can be lowered while, if desired, with the instrumentation tube remaining unmoved.

The present invention provides a secondary or emergency suspension system for the casing 2 in which the fuel rods and all the other necessary parts of the fuel assembly are carried, by taking advantage of the above facts concerning the typical construction of the components of a gas-cooled reactor core.

As previously noted, the bottom end of the casing 2 is formed by the nozzle 2b. The lower part of the hexagonal portion or can proper merges into these nozzles, this being done in the usual fashion in the present case but, and this is noteworthy, the nozzle connection is formed by abutting parts 7. In other words, the nozzle can direct an upward force into the casing extending above it.

The top end of the nozzle has a cross bar 8 extending across it and including a central collar 9 which is internally threaded and into which an externally threaded vertically bored mounting 10 is screwed, the mounting 10 depending from the cross bar 8. The mounting 10 has a bottom shank 10a which is counterbored and internally threaded. To hold the instrumentation tube 5 concentrically with respect to the casing's bottom end or nozzle 2b down through which the gas coolant flows, a tube guide 11 has an externally threaded shank which is screwed into the internally threaded counterbore of the mounting 10. The instrumentation tube 5 is vertically slidable in this tube guide 11 but is normally held by the tube guide concentrically within the nozzle.

According to the present invention, this tube guide is made with an annular recess 11a which mounts four symmetrically arranged latches 12 which swing inwardly to engage an annular recess 5c formed in the bottom end of the instrumentation tube 5, this annular recess serving as a common latch catch for all four of the latches. To effect this mounting, the upper ends of the latches, in each instance, form inwardly extending hooks 12a which form pivot points by rocking in the recess 11a, the latches depending from these upper ends and forming inwardly extending latch surfaces 12b which, upon downward movement of the fuel assembly if accidentally released, engage the annular shoulder formed by the bottom end of the annular recess 5c, the latches' upper ends 12a then abutting an external flange formed by the bottom surface of the tube guide 11 defined by the recess 11a. Under these conditions, the latches function as four vertical struts or columns transmitting the weight of the fuel assembly from the shoulder of the tube guide 11, formed by its annular recess 11a, downwardly through the latches and to the latch surfaces 12b to the shoulder formed by the recess 5c in the instrumentation tube's bottom end, the instrumentation tube 5 then carrying the weight of the assembly, in tension.

Radially outward movement of the four latches is prevented by a vertically slidable locking ring 13 from which two wings 13a diametrically extend in radial directions with their outer ends spaced inwardly from the inside of the casing's nozzle, this locking ring 13 normally resting on radially outwardly extending shoulder elements 12c which extend from the latches in each instance, the latches having wedge surfaces 12d above these shoulders 12c and which are engaged by the locking ring 13 under normal conditions. In this way the four latch members are pressed radially inwardly so long as the locking ring 13 rests on the shoulder 12c and wedge inwardly the wedging surfaces 12d of the latches. The midportions of the latches form inwardly extending shoulders 12e which form abutments, while the bottom end of the tube guide 11 forms an opposing abutment, and a ring 14 is positioned slidably on the instrumentation tube 5 between these two mutually opposing abutment surfaces.

In the event of an accidental release of the casing and theoretically possible buckling of the upstanding portions of the latches, the locking ring 13 holds the latches firmly inwardly while the ring 14 is engaged between the opposing abutment surfaces so as to carry the weight of the fuel assembly, even in the event of such partial failure of the latches.

Although the latch arrangement described may be formed by relatively loose parts, in the event the suspension of the fuel assembly should fail, the possible falling distance of the fuel assembly is extremely short and its downward motion is restrained before the assembly can gain an unmanageable downward velocity.

Figure 3:
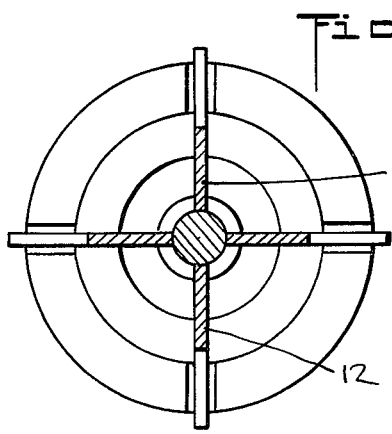
FIG. 3 is the same as FIG. 2 but with the tool means inserted through the open bottom end of the casing of the fuel assembly, the latching means being ready for actuation by the tool.
Figure 5:
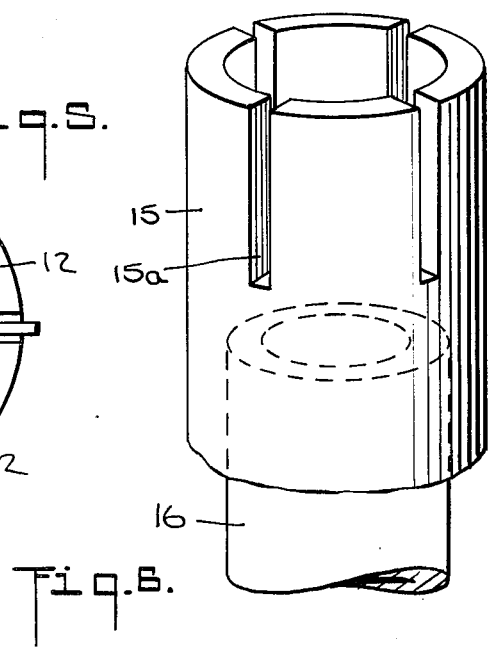
FIG. 5 is a cross section taken on the line V—V in FIG. 3.
Figure 3:
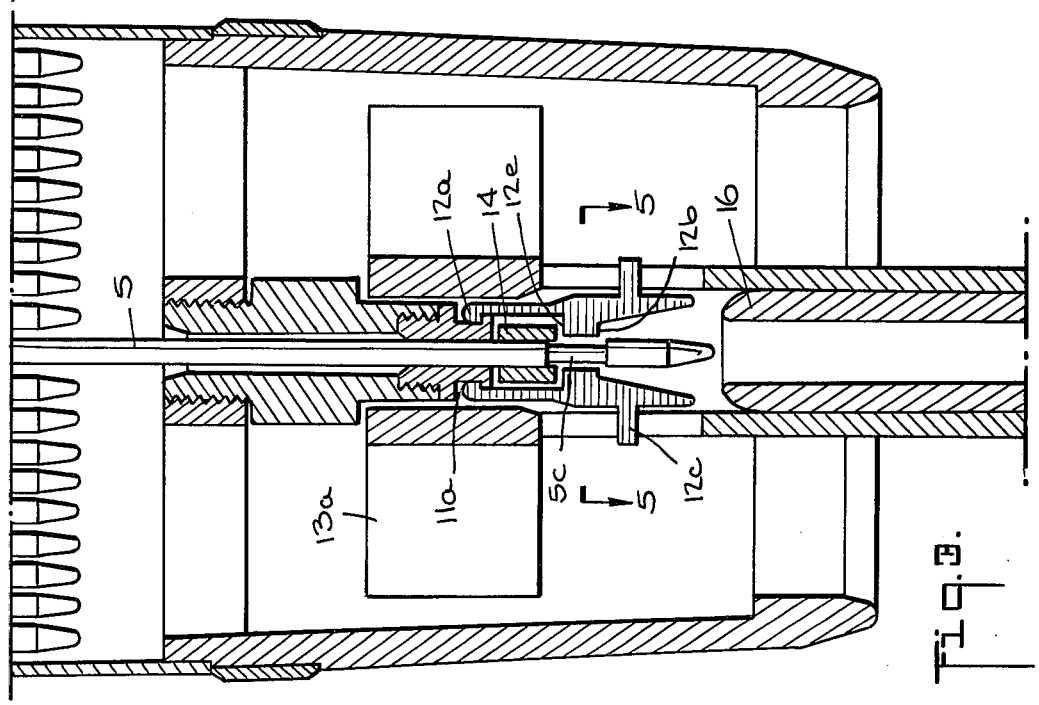
Figure 2:
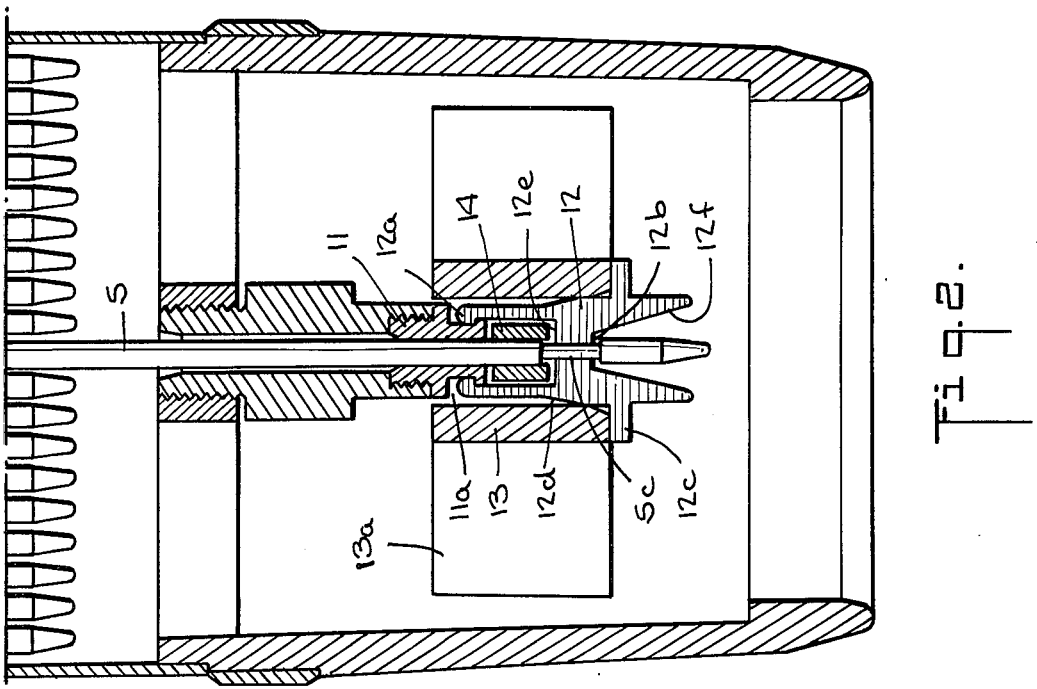
Figure 2:
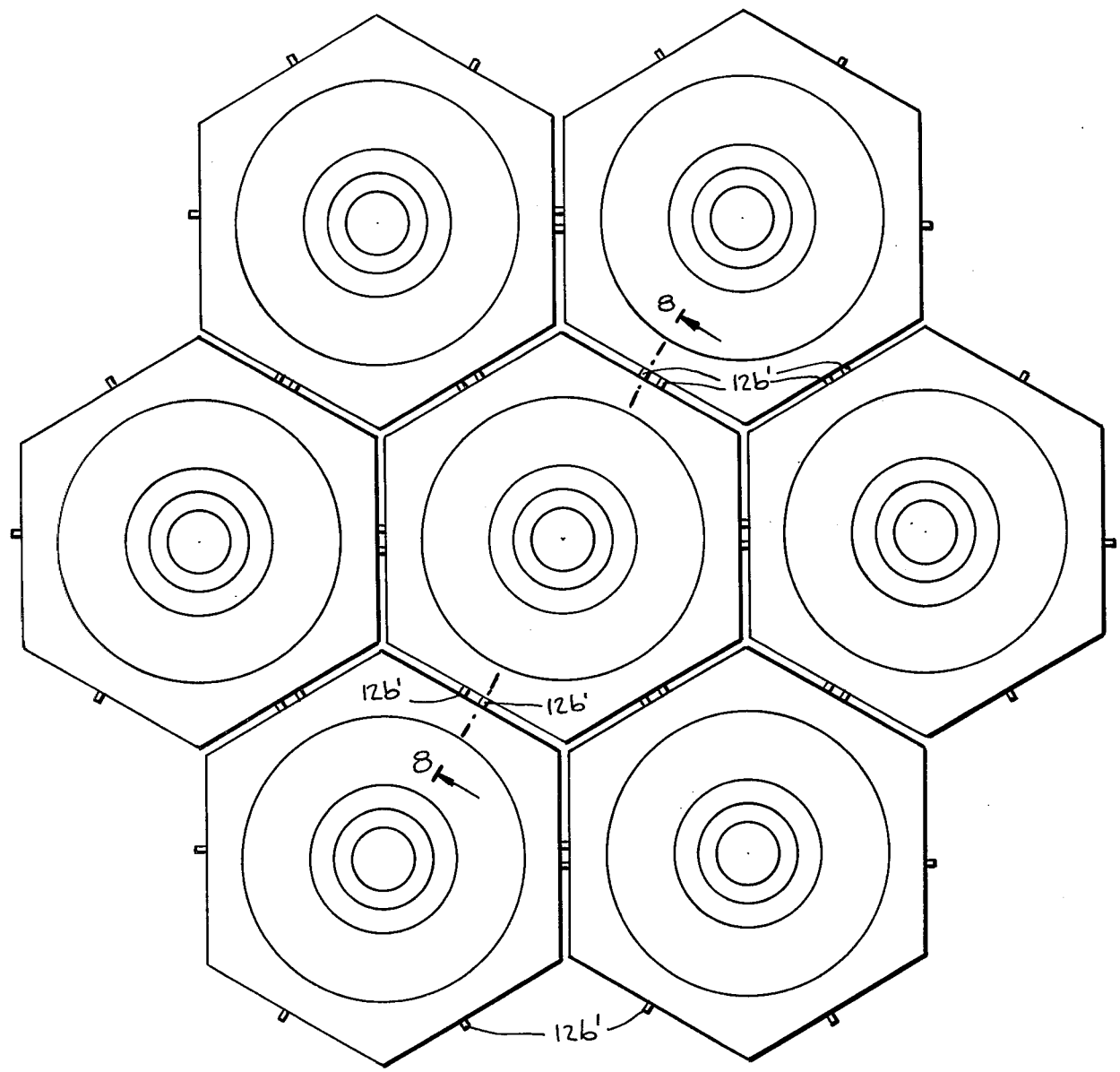

To effect unlatching when either the instrumentation tube is to be lifted or the fuel assembly is to be lowered, the tools shown by FIG. 5 and 6 may be used, FIG. 6 showing only the upper end of the tool but it being understood that the tube is long enough to be used through the vessel bottom when the reactor is shut down. This tool comprises an outer tube 15 having vertical slots 15a positioned to provide clearance for the four latches, these latches being flat parts as indicated by FIG. 5. Using this tool, as shown by FIG. 3, the outer tube 15 can be inserted through the open bottom end of the casing's nozzle, to engage and lift the vertically slidable locking ring 13 so that the four latches are unlocked and can be swung radially outwardly.

Figure 4:
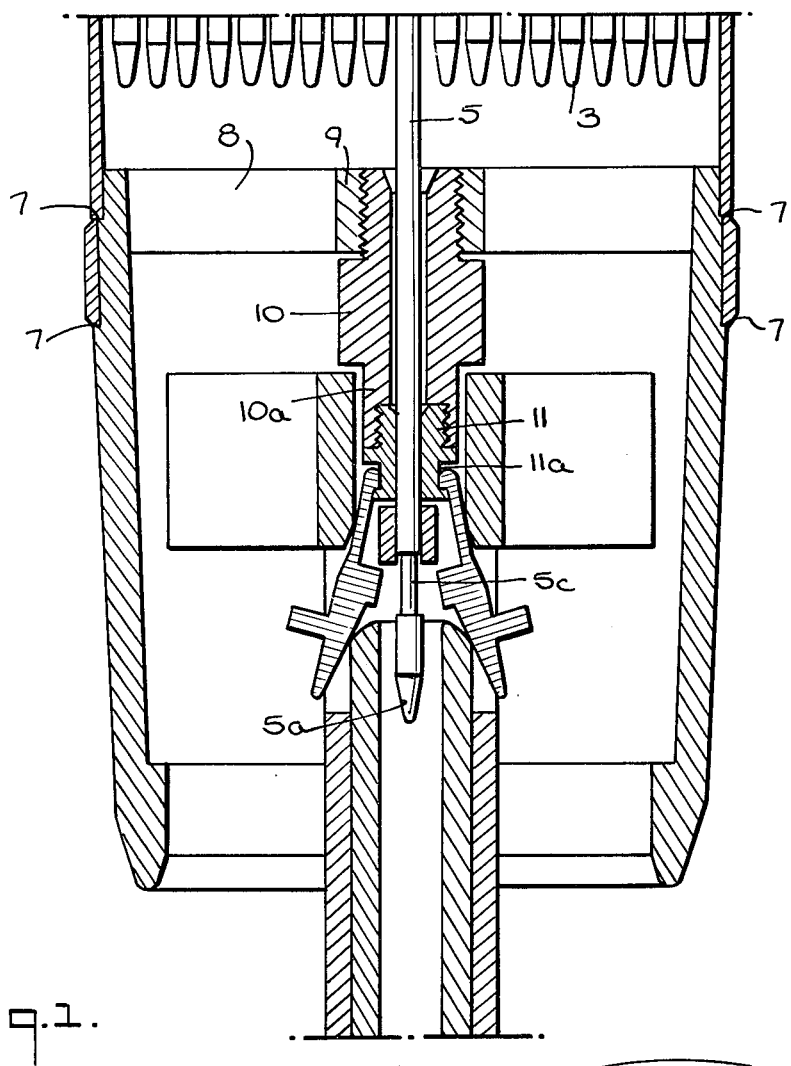
FIG. 4 shows the tool in the act of unlatching the latch means.
Figure 2:
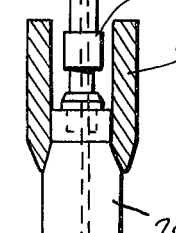
FIG. 2 is a vertical section taken on the line II—II in FIG. 1 and showing an example of the invention when the latching means latches with the bottom end of the instrumentation tube.

The tool comprises also a relatively slidable inner tube 16 having a top end chamfered inwardly, the latches having outwardly flared lower ends 12f for engagement by the inwardly chamfered end of the inner tube 16 as it is slid upwardly while the outer tube 15 holds the locking ring 13 upwardly, the latches being then swung to their unlocking positions as shown by FIG. 4.

When the latches are thus unlocked, intentional lowering of the fuel element can be effected, the tool being correspondingly lowered while holding the latches unlocked. Also, of course, the instrumentation tube 5 can be lifted free of the fuel assembly.

In the event no tool is available, and other forms of tools are possible, the wings 13a of the ring 13 permit almost any kind of tool to be used to push the locking ring upwardly, and with the latches thus unlocked, the use of other tools can be used to move these latches to their unlatched position.

When the fuel assembly is returned to its position shown by FIG. 1, the tool can be used to hold the latches unlatched during reinsertion of the instrumentation tube 5, this ordinarily being drawn upwardly during intentional removal of the fuel assembly.

In the second example of the invention, the casings of the adjacent or adjoining fuel assemblies of the group of fuel assemblies shown by FIG. 7, are used as a secondary suspension means. A reactor core may comprise a substantially larger number of assemblies, only seven being shown in FIG. 7.

Figure 8:
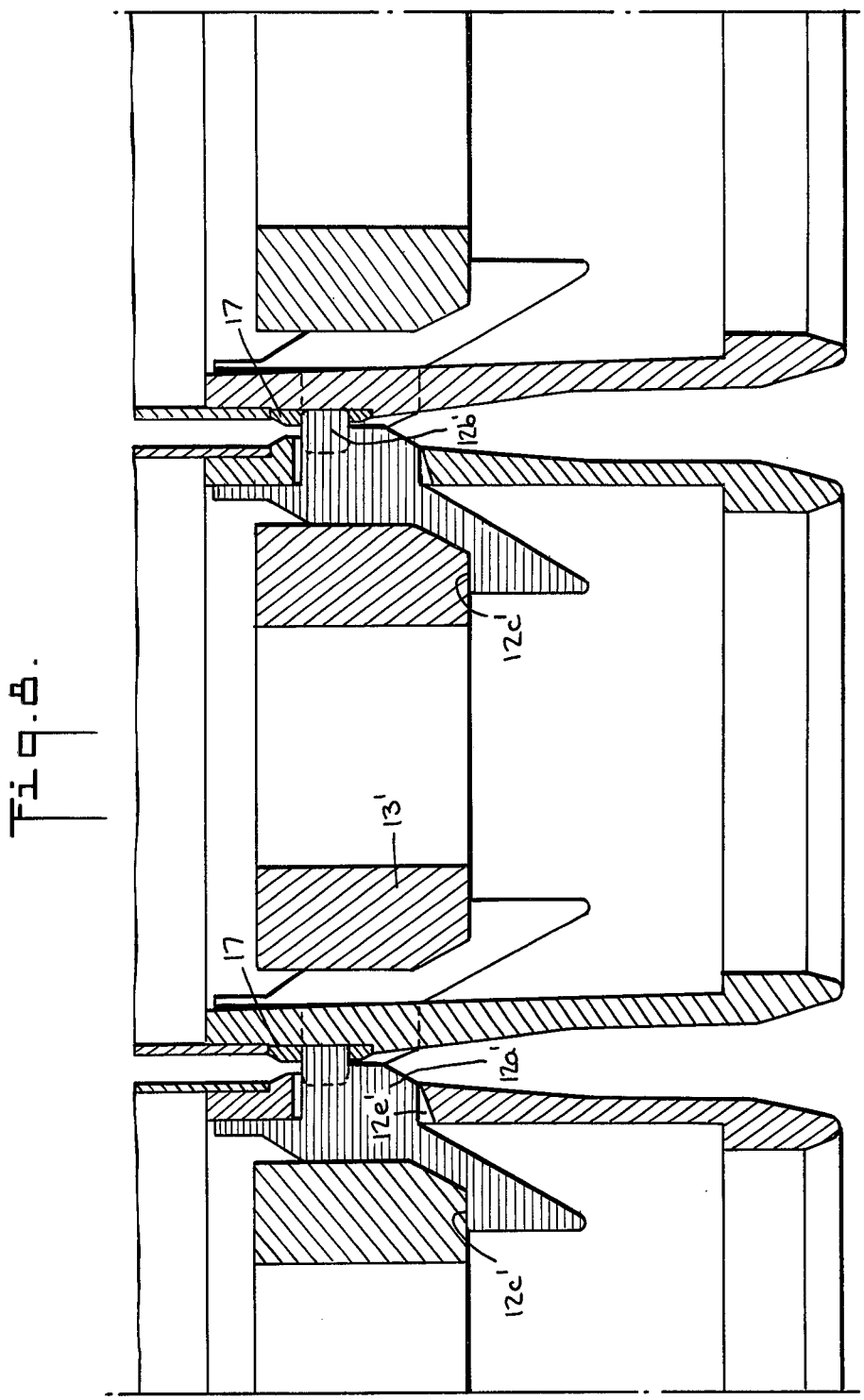
FIG. 8 is a vertical section taken on the line VIII—VIII in FIG. 7, this showing an example of the latching means interlatching the adjacent fuel element casings.

Having reference to FIGS. 8 and 9, it can be seen that the latches substantially correspond to those shown in the case of the first example.

The difference is that in this second example the portions 12a' of the latches, rock in openings 12e' formed in each of the flat sides of the hexagonal shape, while the locking ring 13' rests on the inside surfaces of all of the latches by way of their inwardly extending shoulders 12c', while the latching surfaces 12b' engage in recesses formed in the rings 17 which encircle the nozzles and, in part, provide the abutting surfaces 7 previously referred to.

With this somewhat reversed arrangement, there are two latches adjacent to each other as to each of the opposing flat sides of the fuel assembly group forming the core, as can be seen from FIG. 7. Therefore, as to any one of the assemblies, the latches of all of the assemblies surrounding that assembly, must be released when the one assembly is to be removed, and this is shown by FIG. 9 in the case of three of the assemblies. In this case the tool has the inner sliding tube 16' slotted for clearance of the latches, and it is the outer sliding tool 15' which has the chamfered ends, the chamfer being inwardly in this case to engage the depending latch lever portions which function as latch release means. FIG. 9 shows the action with the latches released. The latch catches formed by the recesses in the ring 17 may be subject to wear, but these rings can be made of suitable hard material.

In this second example, the instrumentation tube is not used as the secondary suspension, but it could, or course be used for its normal purpose to determine the temperature of the gas coolant flowing downwardly through the nozzle of the assembly, as to each assembly.

What is claimed is:

1. A nuclear reactor having a core comprising a plurality of laterally adjacent fuel assemblies, each assembly comprising a vertically elongated casing containing fuel rods and the casing having an upper end and extending downwardly therefrom and having an open lower end extending below said fuel rods, each casing having a vertical tubular suspension rod having an upper end with a supported connection above said casing and a lower end with a connection to the casing's said upper end so that the casing is suspended thereby, at least one of said connections being releasable, each assembly having a rod-like element having an upper end fixed above said casing, said rod-like element suspending from its said upper end downwardly and sliding by through said tubular suspension rod and the casing and having a lower end below the fuel rods and in the casing's said lower end, each fuel assembly independently of its said rod-like element being individually removable downwardly from the core by release of the releasable connection of its said suspension rod, failure of said suspension rod or its said connections in the case of any one of said assemblies causing an accidental release of such assembly so that it can fall from the core while its said rod-like element and any adjacent fuel assembly casing remain suspended so as to form vertically fixed parts relative to the released assembly, each of said casings having latch means for releasably normally latching its casing to one of said relatively fixed parts so that an accidentally released assembly cannot fall substantially relative to that one of the relatively fixed parts, said latch means having a latch release means on the inside of said lower end of the casing for actuation by tool means removably inserted upwardly via said lower end of any of said casings.

2. The reactor of claim 1 having releasable lock means for locking said latch release means against actuation, said lock means being releasable by said tool means.

3. The reactor of claim 1 in which said rod-like element forms said relatively fixed part.

4. The reactor of claim 1 in which said adjacent fuel assemblies form said relatively fixed parts.

5. The reactor of claim 2 in which said latch means comprises in each instance a plurality of interspaced annularly arranged latches having pivotal connections with said casing so the latches swing radially with respect to the casing, each latch having a latching surface extending towards said fixed part and the latter having a latch catch for each of said latching surfaces, each latch having a bottom portion forming a surface that angles downwardly for engagement by an upwardly moved tool for radially swinging the latch so as to disengage its latching surface from said latch catch, said lock means comprising a vertically movable locking inside of said casing's said lower end and normally in a down position engaging all of said latches and holding each in a latched position, said ring being movable to an up position by a tool inserted upwardly through said lower end, said up position releasing all of said latches for swinging to unlatched positions.

6. The reactor of claim 5 in which a mounting is fixed to said casing's said lower end concentrically therewith and has a vertical bore through which said rod-like element sliding depends with a lower end below said mounting and in which lower end an annular recess is formed to provide said latch catch, said latches swinging so they all engage and disengage with said latch catch, said locking ring encircling all of said latches, said latches having upper ends pivotally connected to said casing'said lower end via said mounting fixed thereto.

7. The reactor of claim 5 in which said casings have openings for each of said latches in their said lower porition and said latches have upper ends directly pivoted to said casing's said lower end with their said latching surfaces extending outwardly through said openings towards adjacent ones of said fuel asemblies, each of said casing's said lower ends having an external latch catch for each of said latching surfaces, said ring being positioned on the inside of said latches in each instance and normally holding the latches outwardly with their said latching surfaces engaging said latch catches of adjacent assemblies and normally locking all of said assemblies together.

* * * * *